(12) United States Patent
Kimura

(10) Patent No.: US 7,275,725 B2
(45) Date of Patent: Oct. 2, 2007

(54) VACUUM-SUCTION TOOL STAND

(75) Inventor: Toshio Kimura, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 324 days.

(21) Appl. No.: 11/044,514

(22) Filed: Jan. 27, 2005

(65) Prior Publication Data

US 2005/0167565 A1 Aug. 4, 2005

(30) Foreign Application Priority Data

Jan. 29, 2004 (JP) ............................. 2004-021496

(51) Int. Cl.
*A45D 42/14* (2006.01)
(52) U.S. Cl. ............... 248/205.9; 248/205.5; 248/362; 248/676
(58) Field of Classification Search ............... 248/676, 248/205.5, 205.8, 205.9, 362; 269/21; 451/494
See application file for complete search history.

(56) References Cited

U.S. PATENT DOCUMENTS

| | | | | |
|---|---|---|---|---|
| 4,066,249 A | * | 1/1978 | Huber et al. | 269/21 |
| 4,088,312 A | * | 5/1978 | Frosch et al. | 269/21 |
| 4,491,306 A | * | 1/1985 | Eickhorst | 269/21 |
| 5,457,868 A | * | 10/1995 | Blaimschein | 29/559 |
| 5,961,378 A | * | 10/1999 | Inaba | 451/259 |
| 2003/0206285 A1 | * | 11/2003 | Lau | 356/4.09 |

FOREIGN PATENT DOCUMENTS

JP  2003-142312  5/2003
JP  2003-203810  7/2003

* cited by examiner

*Primary Examiner*—Korie Chan
(74) *Attorney, Agent, or Firm*—Rankin, Hill, Porter & Clark LLP

(57) ABSTRACT

When a vacuum-suction tool stand (1) is to be stuck to a table (2), a valve (16) is rotated to a position so that a knob (163) comes to the right side thereof viewed from the front to establish communication between an air suction hole (132) and a cavity (131). Then, by sucking the air within the cavity (131) through the air suction hole (132) using a suction pump (not shown) to make the inside of the cavity (131) close to a vacuum state, thereby the vacuum-suction tool stand (1) is stuck to the table (2). To release suction, the knob (163) of the valve (16) is rotated clockwise by 90 degrees. Then, the communication between an air release hole (15) and the cavity (131) is established and the air is supplied to the cavity (131) in a substantially vacuum state, and thus the vacuum-suction state is released.

5 Claims, 7 Drawing Sheets

VACUUM-SUCTION TOOL STAND

BACKGROUND OF THE INVENTION

1. Field of the Invention

The present invention relates to a vacuum-suction tool stand.

2. Description of Related Art

Conventionally, a magnetic stand has been known as an apparatus for holding a measuring tool such as a dial gage (for example, refer to the document: Japanese Unexamined Patent Application No. 2003-142312).

The magnetic stand includes a base equipped with a magnetic sticking arrangement, which generates sticking force by a magnetic power, a supporting column provided to the upper face of the base, and a bracket, which is provided movably in the vertical direction along the supporting column, for attaching a measuring tool or the like.

A measuring tool (dial gage etc.) is fixed to the bracket, and the base is fixed to a machine tool, a jig, a table or the like by the attracting force of the magnetic power. And in this state, measuring operation of a workpiece or the like is carried out.

However, the magnetic stand in the document is intended to be fixed using a magnetic power. Therefore, there resides such a disadvantage that the object to which the magnetic stand is fixed is limited to magnetic materials.

For example, when chucking a workpiece on a turning machine, centering has to be made on the workpiece. Conventionally, turning machines are generally structured using a magnetic material (such as iron). Accordingly, when a dial gage is attached to the magnetic stand to bring it into contact with the periphery surface of the workpiece, the magnetic stand can be attached to an arbitrary position. However, in some of modern precision turning machines, the bed thereof are made of granite base; thus, the sticking method using magnet is unfit for use.

SUMMARY OF THE INVENTION

An object of the present invention is to provide a vacuum-suction tool stand capable of holding a tool irrespective of the material of an object to be fixed.

A vacuum-suction tool stand according to an aspect of the present invention includes a base provided with an attaching arrangement for fixing a tool and configured in a movable manner on a table, a vacuum-suction arrangement for sticking the base to the table by vacuum suction; and a controller for controlling a vacuum-suction state and a vacuum-suction release state by the vacuum-suction arrangement.

The vacuum-suction tool stand of the present invention is used when an operation is carried out while shifting a tool relative to a workpiece on the table or in a fixed state. Here, the wording "tool" means tools, not limited to measuring equipments such as dial gage, but includes machining tools for scribing operation or the like. Also, the wording "stand" is not limited to such a configuration as a base portion and a supporting column provided thereto, but any shape and/or configuration may be employed if the object of the present invention can be achieved.

According to this invention, when a tool is attached to the attaching arrangement and the base is shifted with respect to the table and fixed at a predetermined position by activating the vacuum-suction arrangement, the base is stuck to the table by vacuum suction. Also, by releasing the vacuum-suction state, the base can be shifted freely on the table. Accordingly, the tool can be fixed at an arbitrary position on the table irrespective of the material of the table, and the tool can be shifted freely on the table depending on requirements by releasing the vacuum-suction.

The vacuum-suction tool stand according to the above aspect of the present invention may be preferably configured so that the vacuum-suction arrangement includes a cavity formed in a face of the base facing to the table toward the inside, an air suction hole for sucking the air from the cavity, and a suction unit that sucks the air within the cavity through the air suction hole.

The invention is arranged so that the cavity is formed in the face facing to the table of the base and the air within the cavity is sucked out using the suction unit (for example, a suction pump) via the air suction hole to stick the base to the table by vacuum suction. The cavity, which is formed in the bottom face of the base covering a large area thereof, performs an even and steady vacuum suction; thus, unstableness or inclination during measurement can be avoided.

In the vacuum-suction tool stand according to the above aspect of the present invention, such configuration may be preferable that an air release hole is formed in the base, and the controller includes a valve that is provided movably in a path communicating the cavity with the air suction hole as well as the air release hole to shut off the communication between the cavity and the air suction hole as well as the air release hole, a first communicating portion formed in the valve for establishing the communication between the cavity and the air suction hole when the valve is changed its position to a certain position from such a state where the communication between the cavity and the air suction hole as well as the air release hole is shut off, and a second communicating portion formed in the valve for establishing the communication between the cavity and the air release hole when the valve is changed its position to another position different from the previous position.

In this invention, when the valve is operated to change its position to a certain position from a state that the valve shuts off the communication between the cavity and the air suction hole as well as the air release hole, the communication between the cavity and the air suction hole is established via the first communicating portion. Owing to this, the air within the cavity is discharged to the outside and the base is stuck to the table by vacuum suction. At this time, the cavity and the air release hole are in a shut-off state. Also, by operating the valve to change its position to another position different from the above described certain position, the communication between the cavity and the air release hole is established via the second communicating portion. Owing to this, the air is supplied to the inside of the cavity; thus the vacuum-suction state is released. At this time, the air suction hole and the cavity are in a shut-off state. Accordingly, only by changing the position of the valve to a certain position or another position, the base can be switched to a vacuum-suction state (fixed state) or a vacuum-suction release state (movable state) with respect to the table.

In the vacuum-suction tool stand according to the above aspect of the present invention, such configuration may be preferable that the valve has a substantially cylindrical shape and is disposed rotatably in the base, and a portion of which is provided with an operation section protruded from the base, and the operation section is provided with a knob.

According to this invention, the valve is provided rotatably and the knob is provided to the operation section protruding from the base. Accordingly, only by performing a rotation operation using the knob, the position of the valve can be easily changed to a certain position or another position.

In the vacuum-suction tool stand according to the above aspect of the present invention, such configuration may be preferable that the valve is provided in a side face of the base, and the base is formed of a magnetic material.

According to this invention, since the valve is provided in the side face of the base, no projection is formed on the upper face of the base; and thus, the operation is prevented from being interfered. Also, since the base itself is formed of a magnetic material, conventional magnetic stand can be attached to the base. Accordingly, even when the table is made of a non-magnetic material, conventional magnetic stand can be used. As described above, since the table is configured so that no projection is formed on the upper face of the base, the magnetic stand is attached on the flat portion of the upper face of the base; thus the magnetic stand can be used stably in a conventional posture.

In the vacuum-suction tool stand according to the above aspect of the present invention, such configuration may be preferable that the vacuum-suction tool stand further includes a compressed-air blow arrangement that blows out compressed air toward the table from the face of the base facing to the table, and a balance controller that controls the vacuum-suction force by which the base is stuck to the table by the vacuum-suction arrangement and the air blow out force by which the base is lifted up away from the table by the compressed-air blow arrangement to be kept at a commensurate level.

According to this invention, the compressed-air blow arrangement that blows out compressed air toward the table from the bottom face of the base is provided. Accordingly, since air layer is formed between the table and the bottom face of the base, the base can be moved smoothly over the table in a state being stuck to the table with a specific force. Also, the balance controller is provided to control the vacuum-suction force by the vacuum-suction arrangement and the blow out force of the compressed air by the compressed-air blow arrangement so that a specific gap is always maintained between the table and the bottom face of the base. Accordingly, even when shifting on the table, the height position of the base is maintained at a specific level. Thus, a high precise measuring operation can be ensured.

DETAILED DESCRIPTION OF PREFERRED EMBODIMENT(S)

Embodiments of the present invention will be described with reference to the drawings below.

First Embodiment

Figure 1:
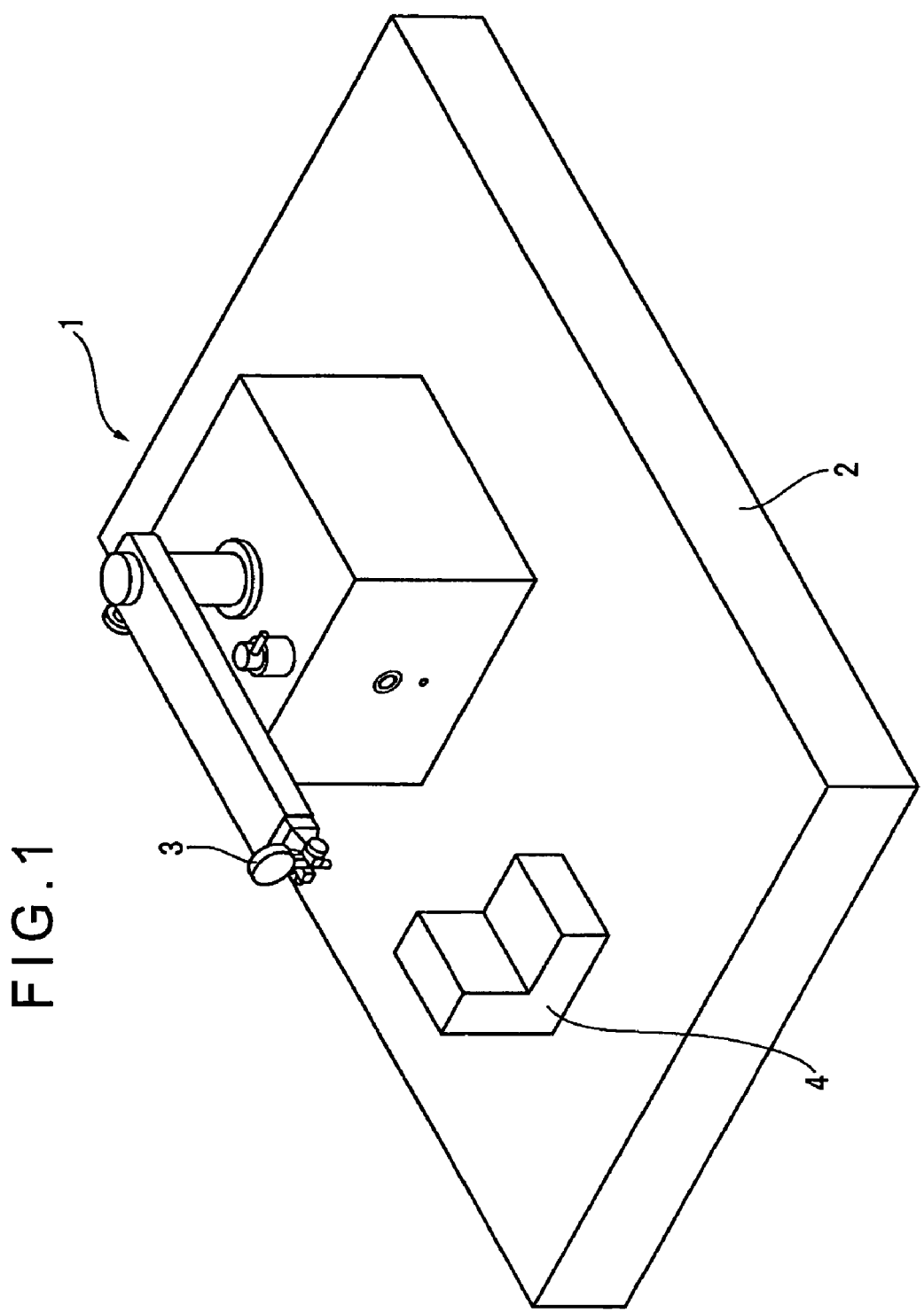
FIG. 1 is a perspective view showing the whole of a first embodiment of the present invention.

FIG. 1 is a perspective view showing the whole of a first embodiment.

Figure 2A:
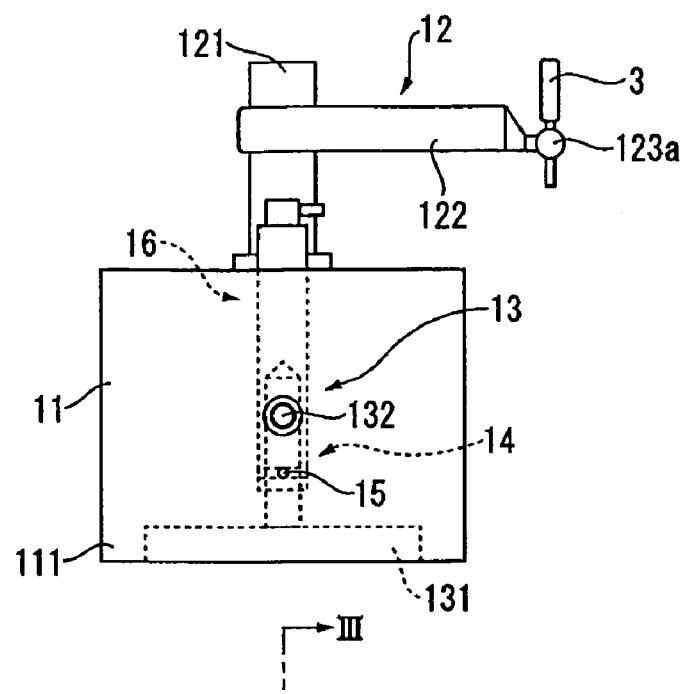
FIG. 2A is a front view of a vacuum-suction tool stand in accordance with the first embodiment.
Figure 2B:
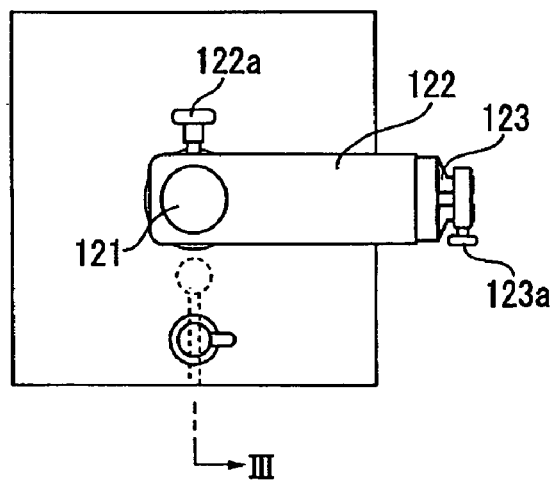
FIG. 2B is a plan view of the vacuum-suction tool stand in accordance with the first embodiment.
Figure 2C:
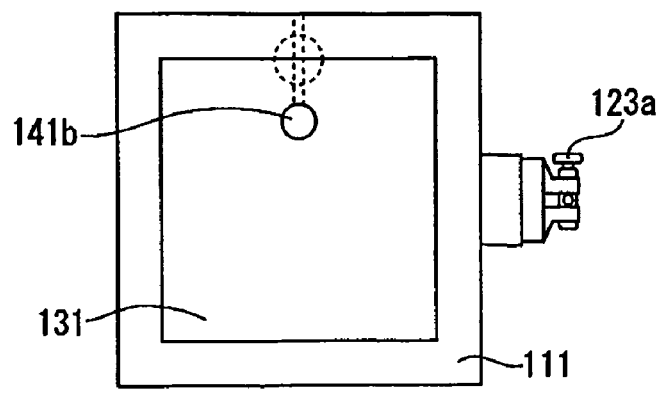
FIG. 2C is a bottom plan view of the vacuum-suction tool stand in accordance with the first embodiment.

FIGS. 2A to 2C are a front view, a plan view and a bottom plan view respectively of a vacuum-suction tool stand 1.

Figure 3:
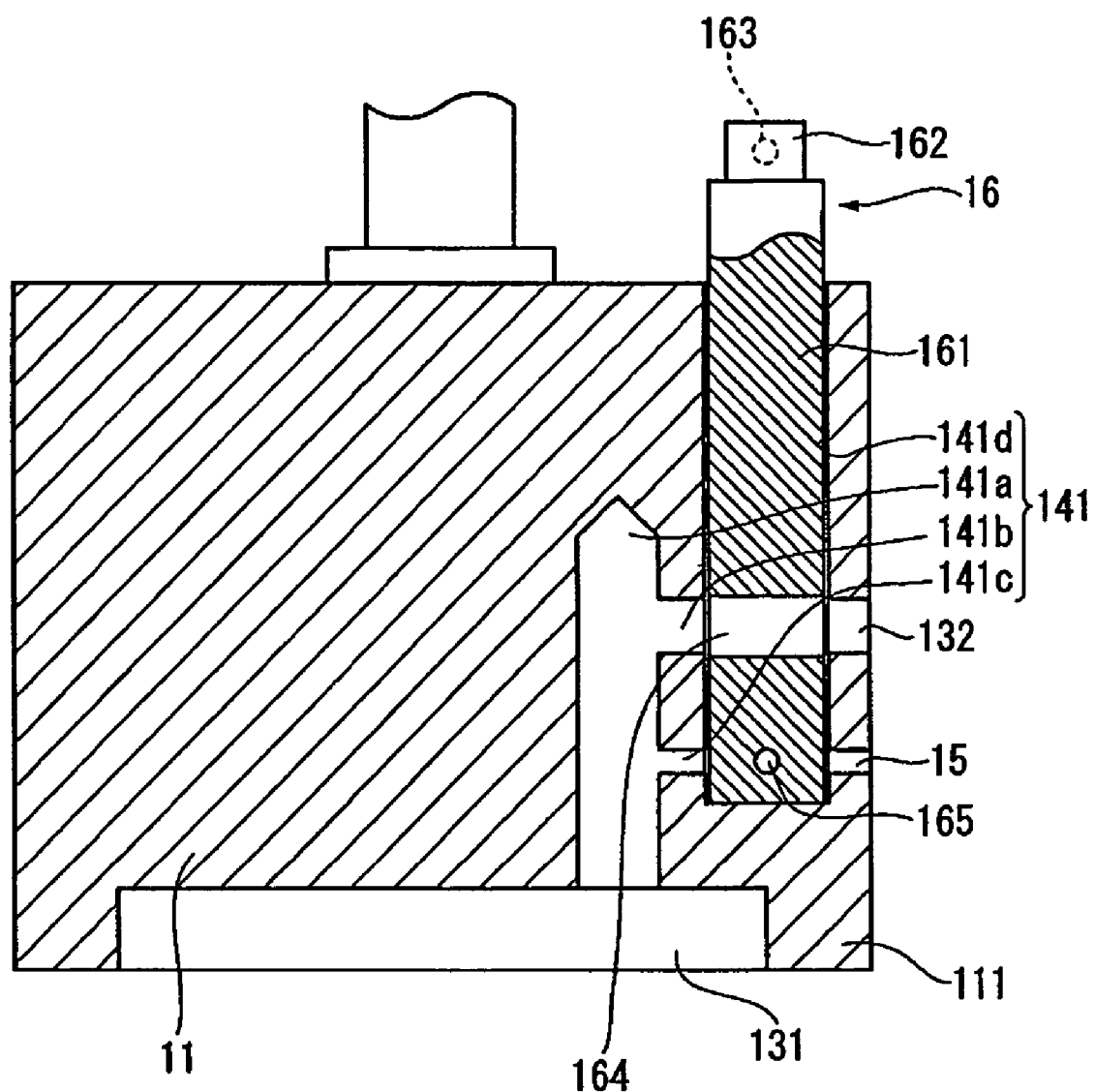
FIG. 3 is a sectional view taken along a line III-III in FIG. 2B.

FIG. 3 is a sectional view taken along a line III-III in FIG. 2B.

The vacuum-suction tool stand 1 of the present invention is used when an operation is carried out on a table 2 in a state that a measuring tool 3 is being shifted or fixed with respect to a workpiece 4.

The vacuum-suction tool stand 1 includes a base 11 configured movable on the table 2, a tool attaching arrangement 12 disposed on the base 11 for fixing the measuring tool 3 as a tool, a vacuum-suction arrangement 13 to vacuum-suck the base 11 to the table 2 and a controller 14 for controlling a vacuum-suction state and a vacuum-suction release state by the vacuum-suction arrangement 13.

The base 11 is formed in substantially a rectangular solid shape, and on the upper face thereof, a tool attaching arrangement 12 is provided. On the lower face, a sliding face 111 is provided to contact with the table 2 with no gap and to support the vacuum-suction tool stand 1.

The tool attaching arrangement 12 includes a supporting column 121 having a substantially cylindrical shape, which protrudes from the upper face of the base 11, a bracket 122 which is provided to the supporting column 121 so as to be movable in the vertical direction and fixed at an arbitrarily position, and a clamp 123 which is provided to the front end portion of the bracket 122 to fix the measuring tool 3. The bracket 122 is equipped with a fixing and adjusting screw 122a for supporting the bracket 122 itself with respect to the supporting column 121. The clamp 123 is equipped with a fixing and adjusting screw 123a for adjusting the hold of the measuring tool 3.

The vacuum-suction arrangement 13 includes a cavity 131, which is formed in a face facing to the table 2 on the base 11, i.e., on the sliding face 111 in a substantially rectangular solid shape toward the inside thereof with the outer periphery edge thereof left, an air suction hole 132 which is formed in the front face of the base 11 for sucking the air from the cavity 131, and a suction pump (not shown) as a suction unit for sucking the air within the cavity 131 via the air suction hole 132.

The controller 14 includes an air release hole 15, which is formed at a lower portion of the air suction hole 132 in the front face of the base 11, and a valve 16, which is disposed movably in a path 141 communicating the cavity 131 to the air suction hole 132 and to the air release hole 15, in which the valve 16 performs open and close function to communicate between the cavity 131 and the air suction hole 132 as well as the air release hole 15. The path 141 includes a vertical hole 141a formed upward from the upper face of the cavity 131, transverse holes 141b and 141c that allow the vertical hole 141a to communicate with the air suction hole 132 and the air release hole 15, and a valve containing hole 141d formed so as to cross these transverse holes 141b and 141c and to be parallel to the vertical hole 141a, in which the valve 16 is contained therein.

Figure 4:
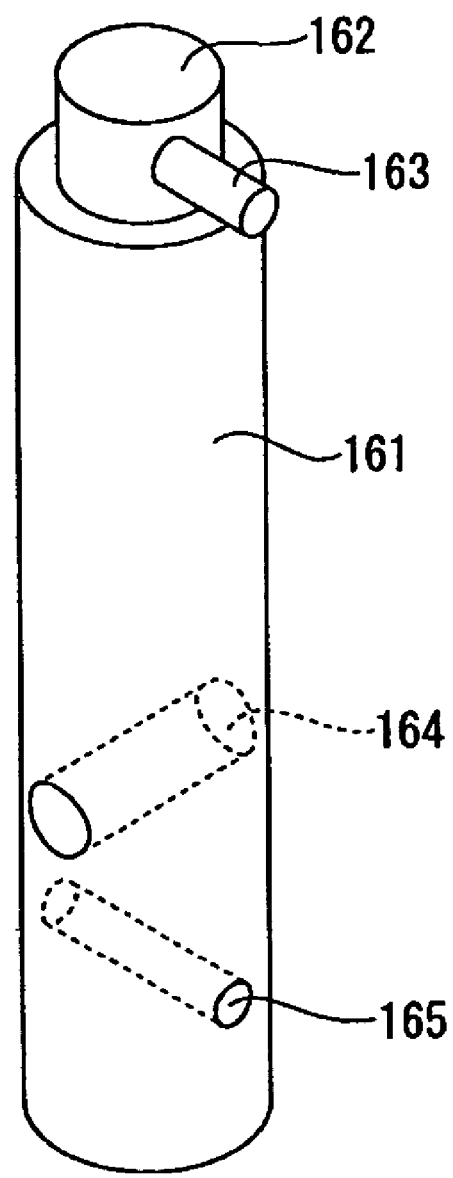
FIG. 4 is a perspective view of a valve 16 in accordance with the first embodiment.

As shown in FIG. 4, the valve 16 formed in a substantially cylindrical shape includes a valve body 161, which is disposed rotatably in the valve containing hole 141d, and an operation section 162 formed at the end portion of the valve body 161; i.e., at the end portion protruding from the upper face of the base 11. A knob 163 for rotation operation of the valve 16 is provided to the side face of the operation section 162. Formed in the valve body 161 are a first communicating portion 164 that establishes the communication between the cavity 131 and the air suction hole 132 when the position of the valve 16 is changed to a certain position from a state that the communication between the cavity 131 and the air suction hole 132 as well as the air release hole 15 is shut off, and a second communicating portion 165 that establishes the communication between the cavity 131 and the air release hole 15 when the position of the valve 16 is changed to another position different from the above mentioned position. The first communicating portion 164 and the second communicating portion 165 are formed so that the directions thereof are perpendicular to each other.

In the embodiment configured as described above, when the base 11 is required to be stuck to the table 2 by vacuum suction, first of all, the valve 16 is rotated to a certain position so that the knob 163 of the valve 16 is positioned at the right side viewed from the front thereof as shown in FIG. 2A. Then, the air suction hole 132, the first communicating portion 164, the transverse hole 141b, the vertical hole 141a and the cavity 131 are allowed to communicate with each other. In this state, the air within the cavity 131 is sucked through the air suction hole 132 using the suction pump (not shown) to make the inside of the cavity 131 closer to a vacuum state. In this situation, the second communicating portion 165 is not aligned with the air release hole 15. Therefore the air release hole 15 and the cavity 131 are in a shut-off state. In this state, the vacuum-suction tool stand 1 is stuck to the table 2 by vacuum suction and securely fixed thereto. Accordingly, no measuring failure would occur due to instability of the vacuum-suction tool stand 1 during measurement.

When releasing the suction of the vacuum-suction tool stand 1, the valve 16 is rotated to another position different from the above-described certain position; i.e., the knob 163 of the valve 16 is rotated clockwise by 90 degrees from a state shown in FIG. 2A. Then, the air release hole 15, the second communicating portion 165, the transverse hole 141c, the vertical hole 141a and the cavity 131 are allowed to communicate with each other, and at the same time, the communication between the air suction hole 132 and the cavity 131 is shut off. Owing to this, the air is supplied to the inside of the cavity 131 in a substantially vacuum state and thus the vacuum-suction state is released. Accordingly, the vacuum-suction tool stand 1 can be moved to an arbitrary position on the table 2.

According to the above-described embodiment (first embodiment), the following effects can be obtained.

(1) By placing the base 11 in a vacuum-suction state with respect to the table 2 by the vacuum-suction arrangement 13, the vacuum-suction tool stand 1 can be securely fixed to the table 2, thus a highly precise measurement or the like can be performed.

(2) By adoption of the vacuum-suction as a fixing method to the table 2, the vacuum-suction tool stand 1 can be fixed to the table 2 irrespectively of the material of the table 2.

(3) Since a large cavity 131 in the bottom face of the base 11 sticks to the table 2 uniformly and stably by vacuum suction, thus the table 2 is prevented from being unstable or inclined during measurement.

(4) By only an operation of the valve 16 to change the position thereof from one to another, the vacuum-suction tool stand 1 can be switched to a vacuum-suction state or a vacuum-suction release state with respect to the table 2.

(5) Since the knob 163 is provided to the operation section 162, turning operation of the knob 163 can change the position of the valve 16 to a certain position or to a position different from the previous position.

Second Embodiment

Figure 5A:
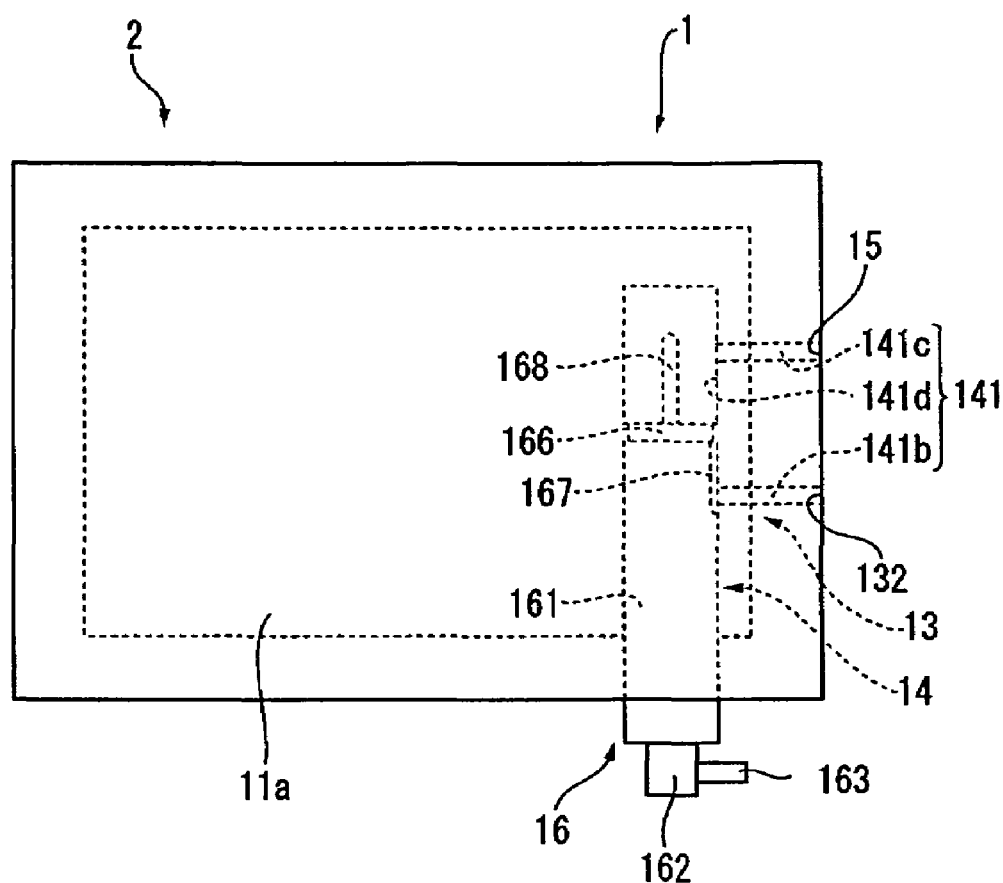
FIG. 5A is a plan view of a vacuum-suction tool stand in accordance with a second embodiment of the present invention.
Figure 5B:
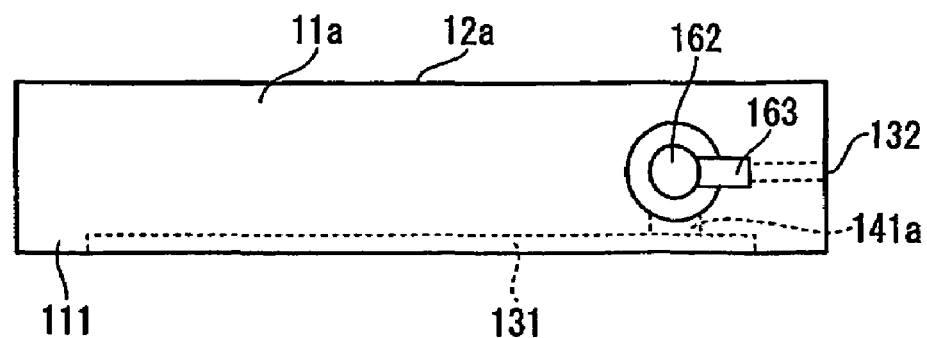
FIG. 5B is a side view of the vacuum-suction tool stand in accordance with the second embodiment.

FIGS. 5A and 5B are a plan view and a side view of a second embodiment respectively. In the description of the second embodiment, similar portions and components to those described in the first embodiment will be given the same reference numerals and the description thereof will be omitted.

A vacuum-suction tool stand 1 in accordance with the second embodiment includes a base 11a formed of a magnetic material in a substantially flat rectangular solid shape, a tool attaching arrangement 12a, which is formed evenly on the upper face of the base 11a allowing a conventional magnetic stand or the like to be placed thereon, a vacuum-suction arrangement 13 formed from the bottom face to the side face of the base 11a and a controller 14 for controlling a vacuum-suction state and a vacuum-suction release state by the vacuum-suction arrangement 13.

The vacuum-suction arrangement 13 includes, same as the first embodiment, a cavity 131 formed in the bottom face of the base 11a, an air suction hole 132 formed in a side face of the base 11a and a suction pump (not shown) for sucking the air via the air suction hole 132.

The controller 14 includes an air release hole 15 formed in a side face of the base 11a and a valve 16, which is disposed movably in a path 141 communicating the cavity 131 with the air suction hole 132 and the air release hole 15, in which the valve 16 controls open and close of the communication between the cavity 131 and the air suction hole 132 as well as the air release hole 15. The path 141 includes, same as the first embodiment, a vertical hole 141a, traverse holes 141b and 141c and a valve containing hole 141d. The following two points are different from the first embodiment; i.e., the transverse holes 141b and 141c are disposed in the side face of the base 11a at a front and rear position respectively with the same height; and the valve containing hole 141d is formed horizontally from the front face toward the rear face of the base 11a.

Figure 6:
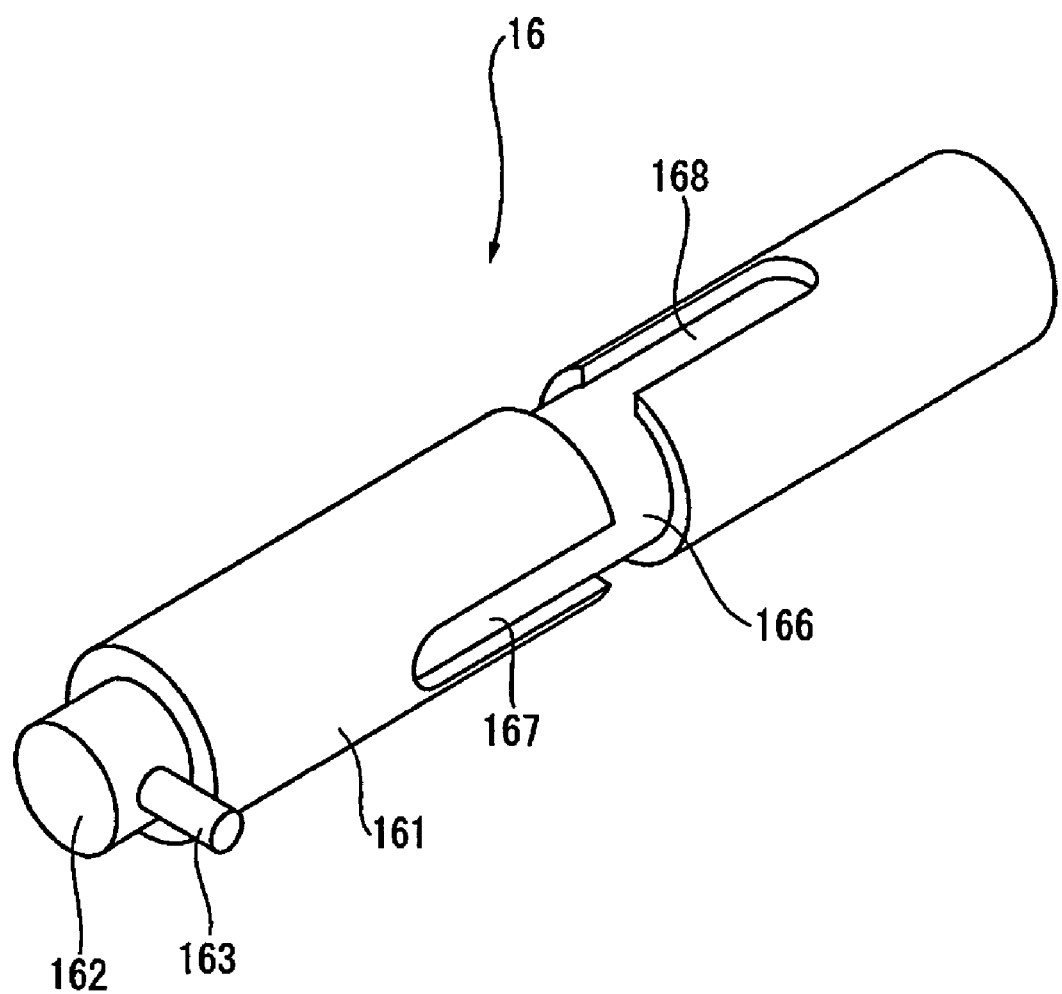
FIG. 6 is a perspective view of a valve 16 in accordance with the second embodiment.

As shown in FIG. 6, the valve 16 includes a valve body 161 and an operation section 162. The valve body 161 includes a central groove 166, which is formed with a slightly smaller diameter than that of the valve body 161 along the circumference in substantially central portion thereof, a first groove 167, which is formed from the central groove 166 toward the direction to the operation section 162 to allow the air suction hole 132, the traverse hole 141b, the central groove 147, the vertical hole 141a and the cavity 131 to communicate with each other, and a second groove 168, which is formed from the central groove 166 toward the opposite direction of the operation section 162 and in a position displaced by 90 degrees from the first groove 167 to allow the air release hole 15, the traverse hole 141c, the central groove 166, the vertical hole 141a and the cavity 131 to communicate with each other.

In the embodiment configured as described above, when the base 11a is stuck to the table 2, the valve 16 is rotated to a certain position; i.e., as shown in FIG. 5B, the valve 16 is rotated so that the front end of the knob 163 comes at the right side viewed from the front thereof. Then, the air suction hole 132, the transverse hole 141*b*, the first groove 167, the central groove 166, the vertical hole 141*a* and the cavity 131 are allowed to communicate with each other. In this state, the air within the cavity 131 is sucked via the air suction hole 132 using the suction pump (not shown) to make the inside of the cavity 131 closer to a vacuum state. At this time, since the second groove 168 faces in the direction of the upper face side of the base 11*a*, the air release hole 15 is in a closed state. In this state, the vacuum-suction tool stand 1 is stuck to the table 2 by vacuum suction.

When releasing the suction of the vacuum-suction tool stand 1, the valve 16 is rotated to another position different from the previous position; i.e., from a state shown in FIG. 5B, the knob 163 of the valve 16 is rotated clockwise by 90 degrees. Then, the air release hole 15, the transverse hole 141*c*, the second groove 168, the central groove 166, the vertical hole 141*a* and the cavity 131 are allowed to communicate with each other, and at the same time, the communication from the air suction hole 132 to the cavity 131 is shut off. Owing to this, the air is supplied into the cavity 131 in a substantially vacuum state; thus, the vacuum-suction state is released. Accordingly, the vacuum-suction tool stand 1 can be moved to an arbitrary position on the table 2.

According to the above-described embodiment (second embodiment), the following effects can be obtained.

(6) Since the valve 16 is disposed in the side face of the base 11*a*, no projections are formed on the tool attaching arrangement 12*a*; and thus, the operation is not interfered.

(7) Since the base 11*a* is formed of a magnetic material and the tool attaching arrangement 12*a* is formed evenly, a conventional magnetic stand can be sucked in the conventional posture on the table 2 of a non-magnetic body.

Third Embodiment

Figure 7A:
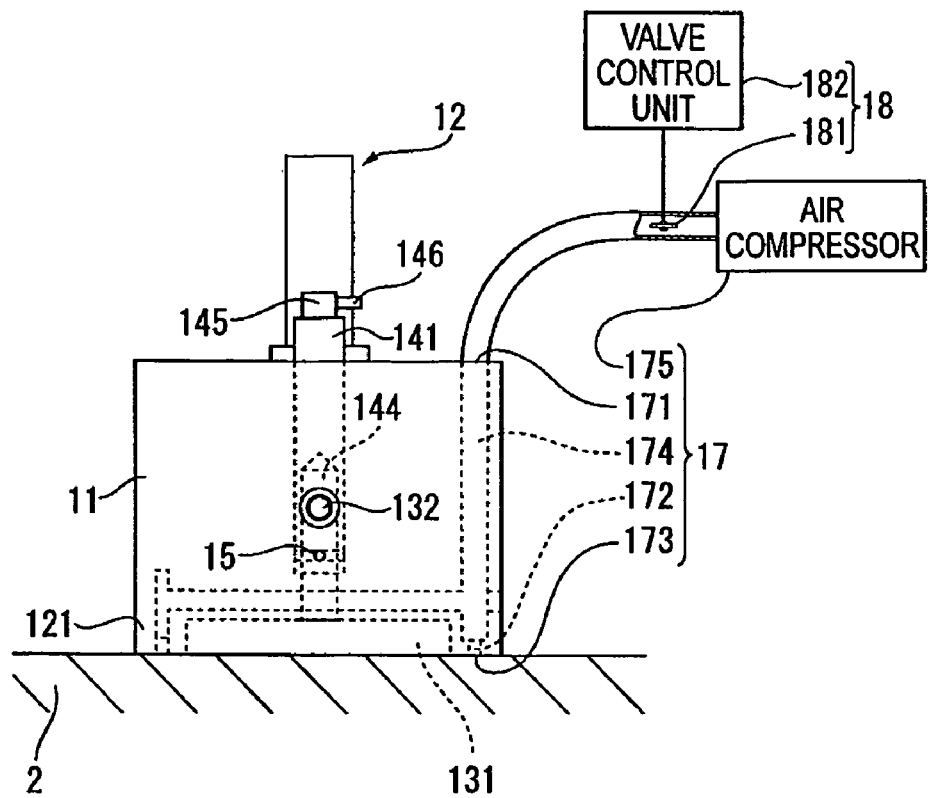
FIG. 7A is a front view of a vacuum-suction tool stand in accordance with a third embodiment of the present invention.
Figure 7B:
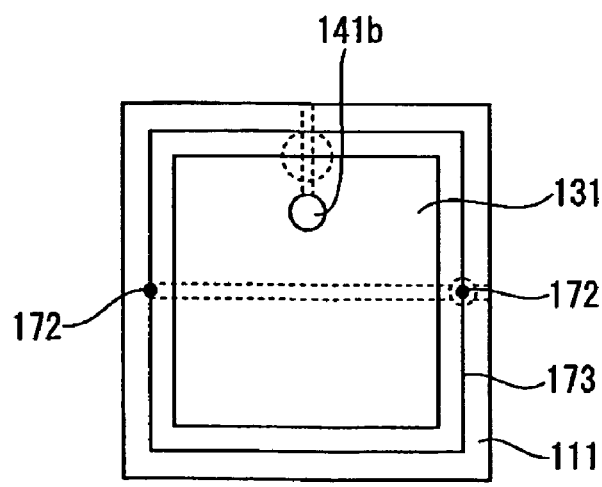
FIG. 7B is a plan view of the vacuum-suction tool stand in accordance with the third embodiment.

FIGS. 7A and 7B are a front view and a bottom plan view of a third embodiment respectively. In the description of the third embodiment, similar portions and components as those described in the first embodiment will be given the same reference numerals and the description thereof will be omitted. In the third embodiment, a compressed-air blow arrangement 17 and a balance controller 18 are added to the first embodiment.

The compressed-air blow arrangement 17 includes a compressed-air inlet 171 formed in the upper face of the base 11, two air blow nozzles 172 located in the lower face of the base 11 that is a sliding face 111, in which the air blow nozzles 172 blow out the compressed air supplied from the compressed air inlet 171 toward the table 2, a narrowed groove 173 that is formed in the surface of the sliding face 111 encircling thereon and connecting one air blow nozzle 172 and the other air blow nozzle 172, a compressed-air path 174 functioning as a supplying path of the compressed air from the compressed-air inlet 171 to the air blow nozzle 172, and an air compressor 175 supplying the compressed air through the compressed-air inlet 171.

The balance controller 18 includes a valve 181 for adjusting the amount of the compressed air supplied from the air compressor 175, and a valve control unit 182 for controlling the operation of the valve 181 to adjust the supplying amount of the compressed air.

In this embodiment configured as described above, the amount of the compressed air is adjusted by the balance controller 18 so that a vacuum suction force by which the base 11 is stuck to the table 2 and an air blow out force by which the base 11 is lifted up away from the table 2 are kept in a commensurate level. In particular, the air suction force in the cavity 131 by the suction pump (not shown) is constant, while the valve 181 is controlled to open/close by the valve control unit 182 to adjust the air blow out force from the air blow nozzle 172. As a result, a specific gap is maintained between the sliding face 111 and the table 2, thus the base 11 can be moved smoothly over the table 2 corresponding to an operation requirement.

According to the above-described embodiment (third embodiment), the following effects can be obtained.

(8) Since the air blow nozzle 172 is provided for blowing out the compressed air toward the table 2 from the bottom face of the base 11, an air layer can be formed between the table 2 and the bottom face of the base 11. Accordingly, the base 11 can be moved smoothly over the table 2 while being stuck to the table 2 with a specific force.

(9) Since the balance controller 18 is provided, the vacuum-suction force is made larger than the air blow out force to eliminate the air layer formed between the table 2 and the bottom face of the base 11 corresponding to operation requirements, thus the base 11 can be fixed strongly to the table 2.

(10) Likewise, since the balance controller 18 is provided, the blow out force of the compressed air via the air blow nozzle 172 can be controlled; thus a specific gap can be always maintained between the table 2 and the bottom face of the base 11. Accordingly, the height position of the base 11 is maintained at a specific level during traveling over the table 2, thus a high precise measuring operation can be ensured.

The present invention is not limited to the above-described embodiments. Any modification, improvement or the like within a scope where the object of the present invention can be achieved should be included in the present invention.

In the above embodiments, the valve 16 is rotated to control open and close of the communication between the air suction hole 132 and the cavity 131, or the communication between the air release hole 15 and the cavity 131. However, the valve 16 may not be substantially cylindrical in shape for turning operation. For example, the valve 16 may be substantially rectangular column in shape to slide in the vertical direction of the valve 16 for controlling open and close of the communication.

Also, in the above embodiments, the measuring tool 3 is attached to the tool attaching arrangement 12. However, the present invention is not limited to the above. For example, a machining tool for scribing or the like may be attached to use.

Further, in the above embodiments, two air blow nozzles 172 are provided. However, the present invention is not limited to the above. A plurality of air blow nozzles, for example 4, 6 or so, may be disposed in well balanced manner.

Furthermore, in the above embodiments, the narrowed groove 173 is formed so as to go around the sliding face 111. However, the present invention is not limited to the above. If the air layer can be formed between the sliding face 111 and the table 2 in well balanced manner, a plurality of narrowed grooves for example, double and triple circles or a shorter length than one round may be formed.

Still furthermore, in the above embodiments, the valve 181 and the valve control unit 182 are provided as the balance controller 18 for the air compressor 175. However, the present invention is not limited to the above. The valve and the valve control unit may be provided for the suction pump only, or for both of the air compressor 175 and the suction pump.

The priority application Number JP2004-021496 upon which this patent application is based is hereby incorporated by reference.

What is claimed is:

1. A vacuum-suction tool stand, comprising:
   a base provided with an attaching arrangement for fixing a tool and configured in a movable manner on a table;
   a vacuum-suction arrangement for sticking the base to the table by vacuum suction; and
   a controller for controlling a vacuum-suction state and a vacuum-suction release state by the vacuum-suction arrangement,
   wherein the vacuum-suction arrangement includes a cavity formed in a face of the base facing toward the table, an air suction hole communicating with the cavity and through which air is sucked out of the cavity, and a suction unit that sucks air within the cavity through the air suction hole.

2. The vacuum-suction tool stand according to claim 1, wherein
   an air release hole is formed in the base and communicates with the cavity, and
   the controller includes a valve that is movably disposed in a path fluidly connecting the cavity with the air suction hole and the air release hole, said valve serving to selectively control fluid communication between the cavity and the air suction hole and between the cavity and the air release hole, wherein a first communicating portion is formed in the valve for establishing communication between the cavity and the air suction hole when a position of the valve is changed to a certain position from a state where communication between the cavity and the air suction hole and between the cavity and the air release hole is shut off, and a second communicating portion formed in the valve for establishing communication between the cavity and the air release hole when the valve position is changed to another position, which is different from the certain position.

3. The vacuum-suction tool stand according to claim 2, wherein
   the valve has a substantially cylindrical shape and is rotatably disposed in the base, a portion of the valve being provided with an operation section protruding from the base, and
   the operation section is provided with a knob.

4. The vacuum-suction tool stand according to claim 2, wherein
   the valve is provided in a side face of the base, and
   the base is formed of a magnetic material.

5. A vacuum-suction tool stand, comprising:
   a base provided with an attaching arrangement for fixing a tool and configured in a movable manner on a table;
   a vacuum-suction arrangement for sticking the base to the table by vacuum suction;
   a controller for controlling a vacuum-suction state and a vacuum-suction release state by the vacuum-suction arrangement; and
   a compressed-air blow arrangement that blows out compressed air toward the table from a face of the base facing toward the table, and a balance controller that controls a vacuum-suction force by which the base is stuck to the table by the vacuum-suction arrangement and an air blow out force by which the base is lifted up away from the table by the compressed-air blow arrangement, whereby a balance between the vacuum-suction force and the air blow out force is kept at a desired level.

* * * * *